United States Patent

[11] 3,631,351

[72] Inventors Thomas O. Paine
Administrator of the National Aeronautics and Space Administration with respect to an invention of;
Stanley Butman, Pasadena, Calif.
[21] Appl. No. 3,696
[22] Filed Jan. 19, 1970
[45] Patented Dec. 28, 1971

[54] SIGNAL PHASE ESTIMATOR
7 Claims, 5 Drawing Figs.

[52] U.S. Cl. .................................................. 328/133, 324/83 A, 324/85, 343/12
[51] Int. Cl. ........................................................ H03d 13/00
[50] Field of Search............................................ 328/133, 141, 155; 307/232, 293, 295; 324/83 A, 85; 343/12

[56] References Cited
UNITED STATES PATENTS

| | | | |
|---|---|---|---|
| 3,235,809 | 2/1966 | Alsberg et al. ................ | 324/83 A |
| 3,246,241 | 4/1966 | Colby, Jr. ....................... | 324/83 A |
| 3,325,813 | 6/1967 | Quick et al. .................... | 324/85 X |
| 3,345,572 | 10/1967 | Kaplan et al. .................. | 324/83 A X |
| 3,461,452 | 8/1969 | Welter............................. | 324/83 A X |
| 3,464,016 | 8/1969 | Kerwin et al. .................. | 328/133 X |
| 3,569,853 | 3/1971 | Wolejsza ........................ | 328/133 X |

*Primary Examiner*—Stanley T. Krawczewicz
*Attorneys*—J. H. Warden, Paul F. McCaul and G. T. McCoy ABSTRACT: Apparatus is disclosed for estimating the amplitude and sign of the phase difference or time delay between a first signal $z(t)$ and a second signal. One replica $s(t)$ of the second signal and another $s[t+(T/4)]$ delayed a quarter period $T$ are correlated with the first according to the equations:

$$x = \frac{1}{AMT} \int_0^{MT} z(t)s(t)dt$$

$$y = \frac{1}{AMT} \int_0^{MT} z(t)s[t+(T/4)]dt$$

where $M$ is a multiple. The term $1/A$ is a term employed to make the signal $z(t)$ equal to the signal $s(t)$ in amplitude. A signal representing the value and sign of the time delay being estimated is then given by $$\hat{\gamma} = \frac{T}{8} \{2SGN(y) - SGN(x)SGN(y)$$

$$- SAT[xSGN(y) - ySGN(x)]\}$$

where $SGN(...)$ indicates the sign of the signal indicated in the parenthesis expressed as plus or minus a unit amplitude, and $SAT[...]$ indicates a value of the expression in the brackets limited to a unit amplitude.

INVENTOR.
STANLEY BUTMAN

BY

ATTORNEYS 3,631,351

SIGNAL PHASE ESTIMATOR

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

This invention relates to a signal processing apparatus, and more particularly to an apparatus for estimating the phase or time delay of one signal relative to another.

In many applications it is necessary to determine the phase angle of one signal relative to another. For example, in a ranging system for locating a distant spacecraft, a signal is transmitted, reflected by the spacecraft and received as a noise-corrupted target return at the transmitter location with a time delay or phase shift that is proportional to the round trip distance to the spacecraft. As another diverse example, it is sometimes necessary or desirable to provide a vector resolver for rectangular to polar coordinate conversion in a control system such that when provided with two input signals representing orthogonal vector components, it will generate a first DC output signal proportional to the vector magnitude and a second DC output signal proportional to the phase angle between the two input signals. While such a diverse example may not present quite the same problem of estimating phase in the presence of white Gaussian noise, the techniques developed for the first example, where noise is a great problem, will serve to equal advantage.

Apparatus for estimating the phase angle $\theta$ of one sinusoidal signal relative to another has been suggested by A. J. Viterbi at page 129 of *Principles of Coherent Communication* published by McGraw-Hill Book Company, Inc. New York (1966). The technique suggested consists of correlating the one signal $z(\tau)$ with in-phase (sin $\omega\tau$) and quadrature (cos $\omega\tau$) components of the second signal $s(\tau)$ to obtain two correlation signals $x(\tau)$ and $y(\tau)$ according to the following equations:

$$x(\tau)=z(\tau)\sin\omega\tau$$
$$y(\tau)=z(\tau)\cos\omega\tau$$

The phase estimate $\hat{\theta}$ is then achieved by first integrating the signals $x(\tau)$ and $y(\tau)$ to achieve signals $x$ and $y$, and solving for $\hat{\theta}$ as the angle having a tangent equal to $y$ divided by $x$. Thus an estimate of the phase of one signal relative to another may be achieved in a simple and straightforward manner when the signals are sinusoids. However, it would be desirable to use the basic in-phase and quadrature correlation techniques for estimating the phase or time delay of one noise-corrupted wave relative to another noiseless wave when the waves are periodic and of the same form and frequency but not sinusoids.

SUMMARY OF THE INVENTION

In accordance with the present invention, the phase or time delay of one nonsinusoidal periodic signal relative to another nonsinusoidal periodic signal is estimated, where the second signal is of the same form and frequency as the first signal, by correlating the one signal with a replica of the other to produce a first low-pass filtered correlation signal $x$, and correlating the one signal with a replica of the other delayed one-quarter period to produce a second low-pass filtered correlation signal $y$. The two correlation signals are then combined in a nonlinear manner to provide a signal proportional to the desired time delay estimate $\hat{\tau}$ according to the equation:

$$\hat{\tau}=T/8\{2SGN(y)-SGN(x)SNG(y)-SAT[xSGN(y)-ySGN(x)]\} \quad (1)$$

where $T$ is the period of the replicas, $SGN(y)$ is the sign of the signal $y$, $SGN(x)$ is the sign of the signal $x$ and $SAT[xSGN(y)-ySGN(x)]$ *is a signal proportional to the phase difference between the first and second signals* $z(t)$ *and* $s(t)$, *but limited to the unit amplitude of the second signal.*

DESCRIPTION OF THE PREFERRED EMBODIMENT

Figure 1:
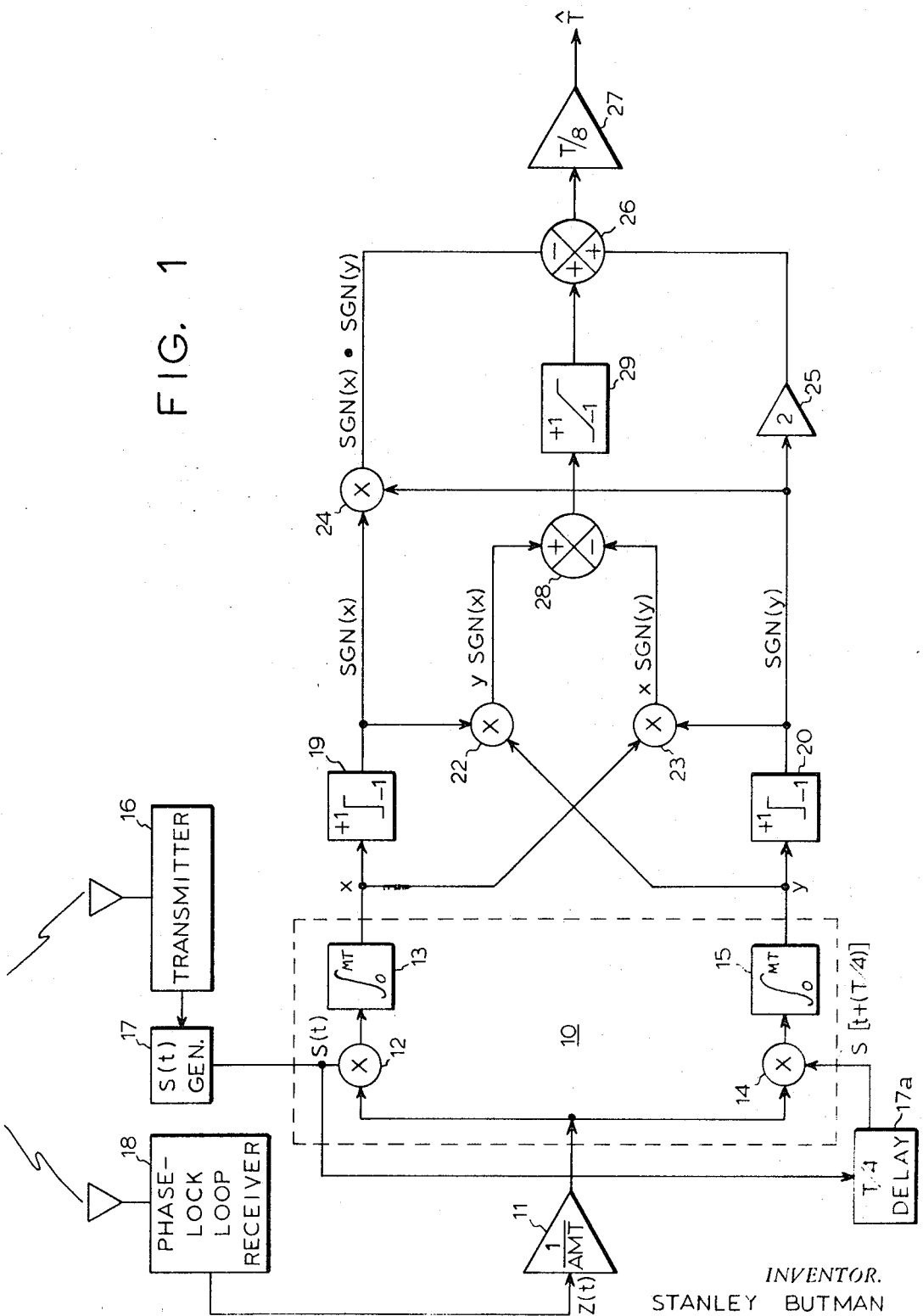
FIG. 1 is a schematic diagram of a preferred embodiment of the present invention.

Referring to FIG. 1, a two-correlator phase estimator is disclosed having a correlating section 10 receiving an input signal $z(t)$ through an amplifier 11 having a gain of $1/AMT$, and two replicas of the input signal, one a signal $s[t+(T/4)]$ delayed one-quarter period with respect to the other signal $s(t)$. The filtered (low-pass) correlator outputs $x$ and $y$ are then processed by the balance of the estimator to give a maximum-likelihood phase or time delay estimate $\hat{\tau}$ independent of the structure of the input signal $z(t)$.

The gain of the amplifier includes a term $1/A$ selected to provide an amplitude of the input signal $z(t)$ equal to the unit amplitude of the signal $s(t)$. The term $1/MT$ is provided for the desired correlation signals $x$ and $y$ as described in the following description of the formulation and theory of the present invention with reference to a square wave. However, it should be understood that the theory and its implementation in the preferred embodiment is not limited to square waves.

Let $s(t-\tau)$ denote a square wave of unit amplitude and period $T$ that has been delayed by an amount $\tau, -T/2 < \tau \leq T/2$, and observed in the presence of additive gaussian white noise $n(t)$ of one-sided spectral density $n_0$, in watts/hertz, as $$z(t)=As(t-\tau)+n(t),\quad 0\leq t\leq MT$$

where $MT$ is the length of the observation time which, for convenience, is taken to be an integral number of periods. It is assumed that $s(t-\tau)$ is present during the entire observation time, starting on or before $t=0$ and extending to $t=MT$ or beyond. It is also assumed that the a priori probability density $p(\tau)$ is uniform on $(-T/2, T/2)$ and that the amplitude of the signal or, equivalently, the value of $N_0$ is known exactly.

When $z(t)$ is correlated with the locally generated square waves $s(t)$ and $s[t+(T/4)]$, the correlator outputs will be given by the following equations:

$$x=\frac{1}{AMT}\int_0^{MT} z(t)s(t)dt \quad (2)$$

$$y=\frac{1}{AMT}\int_0^{MT} z(t)s[t+(T/4)]dt \quad (3)$$

Substitution of $As(t-\tau)+n(t)$ for $z(t)$ in equations (2) and (3) immediately shows that $$x=\bar{x}(\tau)+n_x \quad (4)$$
$$y=\bar{y}(\tau)+n_y \quad (5)$$

where $\bar{x}(\tau)=R(\tau)$, and $\bar{y}(\tau)=R[\tau-(T/4)]$, with $R(\tau)$ being the autocorrelation function of $s(t)$ defined by $$R(\tau)=\frac{1}{T}\int_0^T s(t)s(t+\tau)dt \quad (6)$$

Also, $$n_x=\frac{1}{AMT}\int_0^{MT} n(t)s(t)dt$$

$$n_y=\frac{1}{AMT}\int_0^{MT} n(t)s[t+(T/4)]dt \quad (7)$$

are zero-mean gaussian random variables of variance $E[n_x^2]=E[n_y^2]=\sigma^2=N_0/2MTA^2$, where $E$ is the expectation or averaging operator. They are statistically independent because they have zero cross covariance, $E[n_x n_y]=0$.

In vector notation, we have $z=\text{col}(x,y)$, $\bar{z}(\tau)=\text{col}[\bar{x}(\tau),\bar{y}(\tau)]$, and $n=\text{col}(n_x,n_y)$, where $E[nn^T]=\sigma^2 I$ is the covariance matrix of the noise, $I$ is the two-dimensional identity matrix, and the superscript $T$ denotes transpose. Now, $z$ is conditionally normal with conditional mean $E[z|\tau]=\bar{z}(\tau)$ and covariance matrix $E\{[z-\bar{z}(\tau)][z-\bar{z}(\tau)]^T|_\tau\}=\sigma^2 I$. Consequently, the conditional probability density $p(z|\tau)=p[z|\bar{z}(\tau)]$ is $$p(z|\tau)=(2\pi\sigma^2)^{-1}\exp\left[-\frac{\|z-\bar{z}(\tau)\|^2}{2\sigma^2}\right] \quad (8)$$

or $$p(x,y|\tau)=(2\pi\sigma^2)^{-1}\exp\left\{-\frac{[x-\bar{x}(\tau)]^2+[y-\bar{y}(\tau)]^2}{2\sigma^2}\right\} \quad (9)$$

where $\|\cdot\|$ denotes the Euclidian norm.

The a posteriori probability density, as given by Bayes' rule, is $$p(\tau|z)=\frac{p(z|\tau)}{Tp(z)} \quad (10)$$

where $p(\tau)=1/T$ is the assumed a priori density. It is obvious from equation (10) that the most probable a posteriori estimate, $\hat{\tau}$ that maximizes $p(\tau|z)$ over $-T/2<\tau\leq T/2$ also maximizes $p(2|\tau)$ and is therefore, identical to the maximum-likelihood estimate, given $z$. However, from equation (8) or (9) it is clear that $p(z|\tau)$ is greatest when $$\|z-\bar{z}(\tau)\|=\{[x-\bar{x}(\tau)]^2+[y-\bar{y}(\tau)]^2\}^{1/2}$$

is least.

Geometrically, this implies that $\hat{\tau}$ must be selected such that $\hat{z}=\bar{z}(\hat{\tau})$ is the closest point, from the set of possible points $\bar{z}=z(\tau)$, $\tau\in(-T/2, T/2]$, to the observed point $z$. To determine $\hat{z}$ analytically would be difficult, since it would be necessary to minimize $\|z-\bar{z}\|$ over $\bar{z}\in\bar{Z}$, where $\bar{Z}$ is the locus of points described parametrically by $$\bar{x}=R(\tau)=1-(4|\tau|/T), \quad |\tau|\leq T/2 \quad (11)$$

$$\bar{y}=R[\tau-(T/4)]$$
$$=\begin{cases}4\tau/T & |\tau|\leq T/4\\ 2SGN\tau-(4|\tau|/T), & T/<|\tau|\leq T/2\end{cases} \quad (12)$$

which can be combined into the simpler, but not analytic, constraint equation $$|\bar{x}|+|\bar{y}|=1 \quad (13)$$

Figures 2, 3:
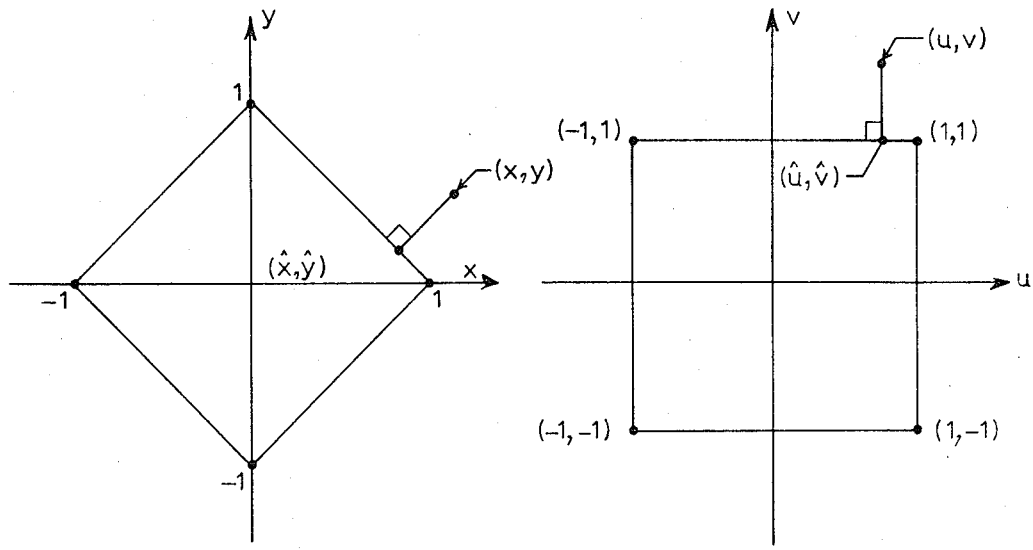
FIG. 2 is a diagram employed to illustrate fundamental theory of the present invention.
FIG. 3 is a diagram of the geometry of FIG. 2, with axes rotated 45°, employed to further illustrate fundamental theory of the present invention.

Equation (13) describes the two-dimensional square of side $2^{1/2}$ shown in FIG. 2.

The geometry shown in FIG. 3 results when the axes are rotated 45° using the transformation $u=2^{116\ 1/2}(x-y)$, $v=2^{116\ 1/2}(x+y)$.

In vector notation we have $w=Uz$, where $$U=2^{-1/2}\begin{pmatrix}1 & -1\\ 1 & 1\end{pmatrix}$$
$$U^{-1}=2^{-1/2}\begin{pmatrix}1 & 1\\ -1 & 1\end{pmatrix} \quad (14)$$

is the orthogonal matrix defining the rotation, and $w=\text{col}(u,v)$ denotes a vector in the new coordinates. Referring to FIG. 3, it is easy to see that the point $\hat{w}=\bar{w}(\hat{\tau})$ that is nearest to the received point $w$ is given by $$\hat{u}=2^{-1/2}SGN2^{1/2}u, \quad \hat{v}=2^{-1/2}SAT2^{1/2}v, \quad |u|>|v|$$
$$\hat{u}=2^{-1/2}SAT2^{1/2}u, \quad \hat{v}=2^{-1/2}SGN2^{1/2}v, \quad |u|<|v|$$

where $SATu=u$ for $|u|<1$, $SATu=SGNu$ for $|u|\geq 1$, $SGNu=1$ for $u\geq 0$, and $SGNu=-1$ for $u<0$.

The region $|u|\geq |v|$ corresponds to the region $SGNx=-SGNy$; similarly, $|u|<|v|$ corresponds to the region $SGNx=SGNy$. Therefore, $$\hat{x}=2^{-1/2}(\hat{u}+\hat{v})=\begin{cases}1/2(SGN2^{1/2}u+SAT2^{1/2}v), & |u|>|v|\\ 1/2(SGN2^{1/2}v+SAT2^{1/2}u), & |u|<|v|\end{cases}$$

becomes $$\hat{x}=\begin{cases}1/2[SGN(x-y)+SAT(x+y)], & SGNx=-SGNy\\ 1/2[SGN(x+y)+SAT(x-y)], & SGNx=SGNy\end{cases}$$
$$=1/2[1+SAT(|x|-|y|)]SGNx \quad (15)$$

Next, from equation (11) we have $|\hat{\tau}|=(1-\hat{x})T/4$, and from equation (12) it is evident that $SGN\hat{\tau}=SGN\hat{y}$. Also, $SGN\hat{y}=SGNy$. Therefore, $$\frac{\hat{\tau}}{T}=1/4\{1-1/2[1+SAT(|x|-|y|)]SGNx\}SGNy \quad (16)$$

From equation (16) we obtain the expression of equation (1) set forth hereinbefore.

The correlation signals $x$ and *ambiguity* are produced in separate channels process terminates when the balance of the ranging ambiguity becomes multiplier 12 and an integrator 13 for the signal $x$ in accordance with equation (2), and a multiplier 14 and an integrator 15 for the signal $y$ in accordance with equation (3). The signal $x$ is referred to hereinafter as the first correlation signal as it pertains to the "autocorrelation" function of $s(t)$ defined by equation (6). The output $y$ is then referred to as the second correlation signal and it pertains to the "cross correlation" function of $s(t)$.

The techniques employed in the correlation section 10 are conventional. The multipliers 12 and 14 may be any conventional circuit of the type commonly referred to as a balanced mixer, or a chopper, comprising solid-state devices for operation at the appropriate frequencies. For example, if the signal $z(t)$ is a square wave used in a sequential ranging system for locating distant spacecraft, the chopper must operate at the frequencies of a transmitter 16. In practice, the signal $z(t)$ is transmitted and received in succession, at frequencies successively halved. The first or highest frequency provides the most precise range estimate within a known multiple of the component wavelength or period. Each succeeding frequency component removes half of the ambiguity left by its predecessors. The ranging process terminates when the balance of ranging ambiguity becomes discernible from other considerations. For each phase measurement, the signal $s(t)$ is provided as a replica of the transmitted signal later received as the signal $z(t)$. Accordingly, for this ranging application of the present invention, the multiplier 12 must be able to operate at the various frequencies to be transmitted. The multiplier 14 receives the signal $s(t)$, but delayed one-quarter period, and must therefore also be able to operate over the same range of frequencies.

The integrators 13 and 15 may be simple low-pass RC circuits having a time constant that is very large in comparison with the time required for the outputs of the multipliers to make an appreciable change. In practice, the integrating period $MT$ is selected to be a large multiple $M$ of the period $T$ of the input signal $z(t)$ in order to average out noise present. Accordingly, the first and second correlation signals $x$ and $y$ may be considered to be essentially DC signals which vary only as the phase between the input signal $z(t)$ varies with respect to the signal $s(t)$.

In this ranging application, the signal $s(t)$ is generated locally in synchronism with the transmitted signal. The signal $s(t+T/4)$ is also generated locally from the signal $s(t)$ through a delay network, or by a separate but synchronized oscillator. Here it is assumed that a local oscillator 17 is synchronized with the transmitter 16 to produce the signal $s(t)$ and that a delay network 17a is employed to produce the signal $s[t+(T/4)]$. A phase locked-lovp receiver 18 provides the signal $z(t)$ to the amplifier 11. However, it should be understood that the present invention is not limited to the ranging application, and that the signal $s\frac{1}{4}t)$ may be completely independent of the input signal $z(t)$. All that is required to determine the phase relationship between the two signals $z(t)$, is that the period of the signal $s(t)$, which may be considered as a reference signal, be equal to the period of the input signal $z(t)$ and that the reference signal to the multiplier 14 be delayed one-quarter period by the delay network 17a.

Signals representing the signs of the first and second correlation signals $x$ and $y$, represented in the equation (1) and FIG. 1 by the legends $SGN(x)$ and $SGN(y)$, are derived by limiting circuits 19 and 20. A suitable limiting circuit may take the form illustrated in FIG. 4. It comprises a difference amplifier 21 fully clamped by diodes $D_1$ and $D_2$ such that if the input signal is equal to or greater (more positive) than zero, the output will be negative ($-SGN$), and if the input signal is less (more negative) than zero, the output will be positive ($+SGN$). Thus, while the input is equal to or more positive than the ground reference connected to a second (+) terminal, the inverting difference amplifier 21 is quickly driven toward saturation, but the output may not go more negative than one unit of voltage due to the clamping action of the diode $D_1$. When the input connected to the first (−) terminal is negative, the amplifier is quickly driven toward cutoff, but the output may not go more positive than one unit due to the clamping action of the diode $D_2$. The unit of voltage may be arbitrarily selected to be, for example, 5 volts. Once selected, the unit (±5 volts) is employed throughout the system to represent ∓1.

Figures 4, 5:
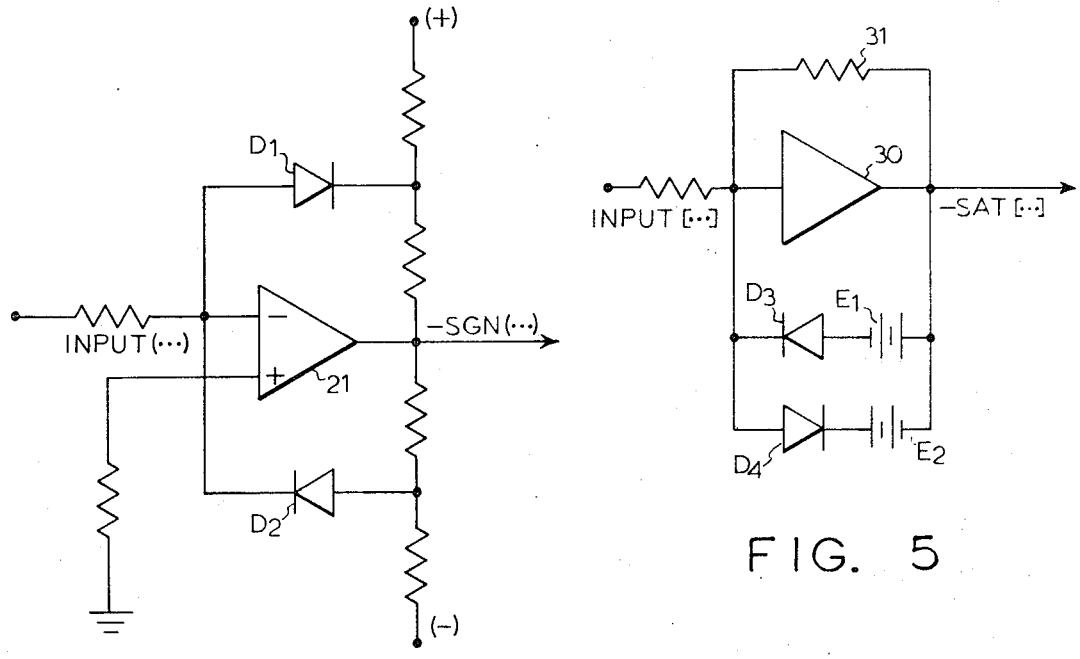
FIG. 4 is a diagram of a signal sign detector (*SGN*) circuit for the embodiment of FIG. 1.
FIG. 5 is a diagram of a signal limiter (*SAT*) circuit for the embodiment of FIG. 1.

In order to implement the equation (1) directly in the manner illustrated in FIG. 1 with sign detector circuits having an inverting function of the type illustrated in FIG. 4, it is assumed that each sign detector circuit includes a second inverting amplifier of unity gain, such that the output is positive when the sign of the input signal is positive, and negative when the sign of the input is negative. The signal $y$ is then multiplied by the signal $SGN(x)$ to form the product signal $y\,SGN(x)$ by a multiplier 22. The signal $x$ is similarly multiplied by the signal $SGN(y)$ to form the product signal $x\,SGN(y)$ by a multiplier 23. Another multiplier 24 forms the product $SGN(x)\,SGN(y)$. Since the signs of the signals $x$ and $y$ may be either positive or negative, all of the multipliers 22 to 24 are implemented as four-quadrant multipliers using conventional techniques.

The first term within the brackets { } of equation (1) is provided by a noninverting amplifier 25 having a gain of 2. The second term derived from the multiplier 24 is then subtracted through a summing network 26. The third term, namely $-SAT[xSGN(y)-ySGN(x)]$ is simultaneously added and the sum is multiplied by the first term $T/8$ through a noninverting amplifier 27 having a gain of $T/8$ to complete implementation of equation (1).

The term $-SAT[xSGN(y)-ySGN(x)]$, which is equal to $+SAT[ySGN(x)-xSGN(y)]$, is formed by a summing circuit 28 which provides an output signal equal to the $ySGN(x)$ minus $xSGN(y)$. That may be readily implemented with an inverting difference amplifier if a signal limiter 29 is also implemented with an inverting amplifier 30, shown in FIG. 5, having feedback limiting diodes $D_3$ and $D_4$. A feedback resistor 31 is selected to be equal to an input coupling resistor 32 so that the output signal $-SAT$ follows the input in amplitude until the output is clamped by the limiting diodes. A bias voltage source $E_1$ limits the positive excursion the negative excursion of the output to +5 volts and a bias voltage source $E_2$ limits the negative excursion of the output to 5 volts. Between +5 volts and −5 volts, the output follows the input linearly in amplitude, but is reversed in sign. In that manner, the inverting function of the signal limiter 29 nullifies the inverting function of the summing circuit 28.

The output signal $\hat{\tau}$ from the amplifier 27 is a DC signal proportional to the phase shift or delay of the input signal $z(t)$ to the reference signal $s(t)$ from $-T/2$ to $+T/2$ with the polarity of the signal directly representing the sign of the phase shift or delay. The sign is determined by the first two terms of the expression for $\tau$ within the brackets of equation (1) while the third term $-SAT(xSGNy-ySGNx)$ determines the amplitude of the output signal. In other words, the sign is ±5 volts as determined by the equation:

$$SIGN = 2\,SGN(y)-SGN(x)\,SGN(y) \qquad (17)$$

This assumes 5 volts has been selected for the unit of the system, but the unit could be any reasonable amplitude value as noted hereinbefore. The expression for the output signal may then be given as follows:

$$\hat{\tau}=T/8[SIGN-SAT] \qquad (18)$$

where $SAT$ is a voltage between +5 volts and −5 volts as determined by the equation:

$$SAT=ySGN(x)-xSGN(y) \qquad (19)$$

Accordingly, if only the sign is desired, the components 22, 23, 28 and 29 may be omitted, and if only the magnitude of the phase shift or delay $\hat{\tau}$ is desired, the components 24 and 25 may be omitted.

Although an exemplary embodiment of the present invention has been described with reference to analog techniques for carrying out the operations indicated by equation (1), it should be appreciated that digital techniques may be employed instead. Accordingly, it is not intended that the scope of the invention be determined by the disclosed exemplary embodiment, but rather should be determined by the breadth of the appended claims.

What is claimed is:

1. Apparatus for estimating the phase difference between a first signal and a second signal, where the second signal is of the same form and frequency as the first signal, comprising:
   means for producing a first correlation signal by multiplying said first and second signals;
   means for producing a second correlation signal by multiplying said first signal by said second signal delayed one-quarter period;
   means for producing a first sign signal of a given voltage amplitude to represent at any given time by its polarity the instantaneous polarity of said first correlation signal;
   means for producing a second sign signal of said given unit voltage amplitude to represent at any given time by its polarity the instantaneous polarity of said second correlation signal;
   means for multiplying said correlation signal by said second sign signal to produce a first product signal;
   means for multiplying said second correlation signal by said first sign signal to produce a second product signal; and
   means for subtracting said second product signal from said first product to derive an output signal having a value proportional to said phase difference within limits of said given unit voltage amplitude.

2. Apparatus as defined in claim 1 including apparatus for determining the sign of said phase difference, comprising:
   means for limiting said output signal to values below said given unit voltage amplitude to produce a limited output signal;
   means for multiplying said first and second sign signals to produce a third product signal;
   means for multiplying said second sign signal by two to produce a fourth product signal; and
   means for adding said fourth product signal and for subtracting said third product signal from said limited output signal, whereby the value of said limited output signal has a sign representative of the sign of said phase difference.

3. Apparatus for estimating the phase difference between a first signal and a second signal, where the second signal is of unit amplitude and of the same form and frequency as the first signal, comprising:
   means for correlating said first signal with a replica of said second signal to produce a first correlation signal $x$;
   means for correlating said first signal with a replica of said second signal delayed one-quarter period to produce a second correlation signal $y$;
   means for producing a first sign signal of said unit amplitude to represent at any given time by its polarity the instantaneous polarity of said first correlation signal;
   means for producing a second sign signal of said unit amplitude to represent at any given time by its polarity the instantaneous polarity of said second correlation signal;
   means for multiplying said first correlation signal by said second sign signal to produce a first product signal;
   means for multiplying said second correlation signal by said first sign signal to produce a second product signal; and
   means for subtracting said second product signal from said first product to derive an output signal having a value proportional to said phase difference within limits of said unit amplitude.

4. Apparatus as defined in claim 3 including apparatus for determining the sign of said phase difference, and controlling the polarity of said output signal to correspond with the sign of said phase difference, comprising:
- means for limiting said output signal to said unit amplitude to produce a limited output signal;
- means for multiplying said first and second sign signals to produce a third product signal;
- means for multiplying said second sign signal by two to produce a fourth product signal; and means for adding said fourth product signal and for subtracting said third product signal from said limited output signal, whereby the value of said limited output signal has a sign representative of the sign of said phase difference.

5. Apparatus for estimating the amplitude and sign of the phase difference between a first signal and a second signal, where the second signal is of unit amplitude and of the same form and frequency as the first signal, comprising:
- means for correlating said first signal with a replica of said second signal to produce a first correlation signal $x$;
- means for correlating said first signal with a replica of said second signal delayed one-quarter period to produce a second correlation signal $y$; and
- means for combining said first and second correlation signals according to the equation $$\hat{\tau} = T/8 \{2\ SGN(y) - SGN(x)\ SGN(y) - SAT[xSGN(y) - ySGN(x)]\}$$

where $\hat{\tau}$ is an estimate of the time delay of said first signal relative to said second signal producing said phase difference, $T$ is the period of said first and second signals, $SGN(y)$ is the sign of the signal $y$, $SGN(x)$ is the sign of the signal $x$ and $SAT[xSGN(\ ) - ySGN(x)]$ is a signal of amplitude and polarity equal to the value $[xSGN(y) - ySGN(x)]$ limited to said unit amplitude of said second signal.

6. Apparatus as defined in claim 5 wherein said first and second correlation signals are produced according to the following equation:

$$x = \frac{1}{AMT} \int_0^{MT} z(t)s(t)\,dt$$

$$y = \frac{1}{AMT} \int_0^{MT} z(t)s[t + (T/4)]\,dt$$

where $z(t)$ is said first signal, $s(t)$ is said replica of said second signal, $s[t+(T/4)]$ is said replica of said second signal delayed one-quarter period, $T$ is the period of said first and second signals, $M$ is a multiple greater than 1 and $A$ is a number selected to provide an amplitude of said first signal $z(t)$ equal to unit amplitude of said replica $s(t)$.

7. Apparatus as defined in claim 6 wherein equations for said correlation signals include a gain factor $1/A$ selected to provide an amplitude of said first signal equal to said unit amplitude of said second signal.

* * * * *